US007042965B2

(12) United States Patent
Katta et al.

(10) Patent No.: US 7,042,965 B2
(45) Date of Patent: May 9, 2006

(54) JUDGMENT LEVEL SETTING METHOD AND DATA RECEIVER

(75) Inventors: Noboru Katta, Itami (JP); Yuji Mizuguchi, Hirakata (JP); Takahisa Sakai, Amagasaki (JP); Hirotsugu Kawada, Sakai (JP); Toshihiko Kurosaki, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 344 days.

(21) Appl. No.: 10/398,451

(22) PCT Filed: Oct. 5, 2001

(86) PCT No.: PCT/JP01/08786

§ 371 (c)(1),
(2), (4) Date: Apr. 4, 2003

(87) PCT Pub. No.: WO02/30077

PCT Pub. Date: Apr. 11, 2002

(65) Prior Publication Data

US 2004/0013214 A1    Jan. 22, 2004

(30) Foreign Application Priority Data

Oct. 5, 2000    (JP)    ............... 2000-305821

(51) Int. Cl.
*H04L 27/06* (2006.01)
(52) U.S. Cl. .................... 375/345; 455/232.1
(58) Field of Classification Search ......... 375/316, 375/350, 264, 268, 270, 286, 287, 288, 317, 375/318, 319, 320, 326, 340, 345, 354; 455/130, 455/227, 230, 232.1, 240.1
See application file for complete search history.

(56) References Cited

U.S. PATENT DOCUMENTS

| 4,028,667 A | 6/1977 | Breslau et al. |
| 4,083,005 A | 4/1978 | Looschen |
| 4,547,879 A | 10/1985 | Hamelin et al. |
| 4,769,839 A | 9/1988 | Preineder et al. |
| 4,924,492 A | 5/1990 | Gitlin et al. |

(Continued)

FOREIGN PATENT DOCUMENTS

EP    0 450 879    10/1991

(Continued)

OTHER PUBLICATIONS

Oscar Agazzi and Alberto A. Adan, "An Analog Front End for Full-Duplex Digital Transceivers Working on Twisted Pairs", IEEE Journal of Solid-State Circuits, vol. 24, No. 2, Apr. 1989, pp. 229-240.

(Continued)

*Primary Examiner*—Tesfaldet Bocure
*Assistant Examiner*—Naheed Ejaz
(74) *Attorney, Agent, or Firm*—Wenderoth, Lind & Ponack, L.L.P.

(57) ABSTRACT

An evaluation level setting method and a data reception apparatus in which the method is implemented accurately evaluate signal levels in multi-valued transmission for transmitting data while assigning one or more bits of data as one data symbol to a signal level.

A data transmission apparatus outputs an initialization pattern signal at turn-on of power or after reset, and the data reception apparatus establishes clock synchronization on the basis of the received initialization pattern signal and starts data reception after setting of evaluation levels to be used for threshold evaluation of signal levels.

7 Claims, 9 Drawing Sheets

U.S. PATENT DOCUMENTS

| | | | |
|---|---|---|---|
| 4,982,185 A | 1/1991 | Holmberg et al. | |
| 5,052,021 A * | 9/1991 | Goto et al. | 375/317 |
| 5,123,030 A | 6/1992 | Kazawa et al. | |
| 5,204,976 A * | 4/1993 | Baldwin et al. | 455/234.2 |
| 5,206,857 A | 4/1993 | Farleigh | |
| 5,297,163 A | 3/1994 | Pfeiffer | |
| 5,301,185 A | 4/1994 | Cherry | |
| 5,303,265 A | 4/1994 | McLean | |
| 5,392,316 A * | 2/1995 | Sawaguchi et al. | 375/290 |
| 5,471,651 A * | 11/1995 | Wilson | 455/72 |
| 5,517,481 A * | 5/1996 | Kobayashi | 369/47.17 |
| 5,812,594 A | 9/1998 | Rakib | |
| 5,825,243 A | 10/1998 | Sato et al. | |
| 5,850,441 A | 12/1998 | Townsend et al. | |
| 5,898,734 A | 4/1999 | Nakamura et al. | |
| 5,942,994 A | 8/1999 | Lewiner et al. | |
| 6,157,680 A | 12/2000 | Betts et al. | |
| 6,421,323 B1 | 7/2002 | Nelson et al. | |
| 6,545,532 B1 * | 4/2003 | Maalej et al. | 329/304 |
| 2002/0106037 A1 | 8/2002 | Gara | |

FOREIGN PATENT DOCUMENTS

| | | |
|---|---|---|
| EP | 0 490 504 | 6/1992 |
| EP | 0 511 786 | 11/1992 |
| EP | 1039644 | 9/2000 |
| JP | 55-38633 | 3/1980 |
| JP | 5-14419 | 1/1983 |
| JP | 63-110840 | 5/1988 |
| JP | 3-016337 | 1/1991 |
| JP | 3-195144 | 8/1991 |
| JP | 6-29987 | 2/1994 |
| JP | 7-50683 | 2/1995 |
| JP | 8-237239 | 9/1996 |
| JP | 8-317012 | 11/1996 |
| JP | 9-186726 | 7/1997 |
| JP | 9-205466 | 8/1997 |
| JP | 11-509376 | 8/1999 |
| JP | 2000-49764 | 2/2000 |
| JP | 2000-349605 | 12/2000 |

OTHER PUBLICATIONS

Clayton: "Introduction to Electromagnetic Compatibility" 1992, John Wiley & Sons, New York, US XP002279634, chapters 8 and 13.

* cited by examiner

| data | mapping value |
|---|---|
| 111 | +7 |
| 110 | +5 |
| 101 | +3 |
| 100 | +1 |
| 011 | -1 |
| 010 | -3 |
| 001 | -5 |
| 000 | -7 |

JUDGMENT LEVEL SETTING METHOD AND DATA RECEIVER

TECHNICAL FIELD

The present invention relates to an evaluation level setting method to be employed by a data reception apparatus for receiving digital data, and the data reception apparatus. More particularly, the invention relates to an evaluation level setting method for setting evaluation levels to be used for threshold evaluation of a received signal on the basis of an initialization pattern signal.

Background Art

As a conventional data transmission method, there is a method for transmitting data while converting data symbols into signal levels of an electric signal or an optical signal. During such data transmission, when the signal being transmitted continuously takes a constant signal level or when it repeatedly takes a specific pattern of signal levels, a data reception apparatus cannot detect the magnitudes of original signal levels, and therefore, it cannot perform accurate data reception. As a method for avoiding this problem, there is a scrambling method in which data symbols to be transmitted are evenly assigned to all signal levels by adding random numbers to digital data to be transmitted.

FIG. 10 is a diagram illustrating the construction of a data receiver for CATV (CABLE TELEVISION). As shown in figure 10. the data receiver for CATV is provided with a tuner 1001, a down converter 1002, an A/D converter 1003, a detector 1004, a digital filter 1005, an evaluation unit 1006, a descrambler 1007, a clock reproduction unit 1008, and a gain detection unit 1009.

Since CATV data are scrambled, all signal levels are almost evenly included in received data symbols. Usually, quadrature amplitude modulation such as 16 QAM or 64 QAM is employed as a CATV transmission method, and a coaxial cable is employed as a transmission path.

Next, the operation of the CATV data receiver so construction will be described.

A QAM signal received through the coaxial cable is frequency-converted through the tuner 1001 and the down converter 1002, and one channel of QAM signal is input to the A/D converter 1003. This one channel of QAM signal is converted into a digital signal by the A/D converter 1003, and an I-axis signal and a Q-axis signal are separated and demodulated by the detector 1004. After removal of noises through the digital filter 1005, the data symbols are decoded by the evaluation unit 1006 and descrambled by the descrambler 1007, thereby to obtain data. Further, the clock reproduction unit 1008 establishes synchronization by detecting clock shift at the transmitting end from the I-axis signal and the Q-axis signal.

Since the data are scrambled, all signal levels are almost evenly included in the received data symbols. The gain detector 1009 detects the received signal level, and performs gain control for the down converter 1002 so that the signal level is correctly decoded by the evaluation unit 1006. Further, the down converter 1002 performs gain control for the tuner 1001 as desired.

However, the scrambling process needs a data frame for adjusting data timing when performing scrambling or descrambling, and therefore, scrambling cannot be performed on data in a format having no data frame. Moreover, even when scrambling could be carried out, if a data pattern to be transmitted matches a random number sequence used for scrambling, the same signal level continues undesirably.

Furthermore, since, in the conventional data transmission method, it is necessary to receive all signal levels to perform gain control, data should be scrambled to be averaged. However, when a pattern of signal in which only a specific signal level appears continues, gain control becomes impossible, and accurate evaluation of signal levels cannot be carried out.

The present invention is made to solve the above-described problems and has for its object to provide an evaluation level setting method and a data reception apparatus, which realize accurate data transmission independent of signal levels and patterns, without scrambling data to be transmitted, in multi-valued transmission.

Disclosure of the Invention

In order to solve the above-described problems, according to an embodiment of the present invention, there is provided an evaluation level setting method to be employed in a data reception apparatus which receives a signal in which one or more bits of data is assigned as one data symbol to a signal level. This method comprises: receiving an initialization pattern signal which is outputted from a data transmission apparatus, at turn-on of power or immediately after reset; establishing clock synchronization on the basis of the initialization pattern signal, and setting evaluation levels with which signal levels are subjected to threshold evaluation; calculating ideal values of the respective signal levels on the basis of the evaluation levels which are set according to the initialization pattern signal, and holding the ideal values; and adjusting the gain of a received signal on the basis of a difference between the signal level of the received signal and an ideal value of the signal level, thereby to correct variations in the received signal.

According to another embodiment of the present invention, in the evaluation level setting method discussed above, the initialization pattern signal is a signal in which a maximum signal level and a minimum signal level appear alternately.

According to another embodiment of the present invention, in the evaluation level setting method discussed above, the initialization pattern signal comprises a signal in which a maximum signal level and a minimum signal level appear alternately, and a following signal in which all signal levels appear in a predetermined arrangement.

According to another embodiment of the present invention, there is provided a data reception apparatus for receiving a signal in which one or more bits of data is assigned as one data symbol to a signal level. This apparatus comprises: a synchronization detection unit for performing clock reproduction on the basis of received signal levels, thereby to detect establishment of synchronization; an evaluation level holding unit for calculating evaluation levels with which the respective signal levels are subjected to threshold evaluation, and holding the evaluation levels; a data symbol value holding unit for calculating ideal values of the respective signal levels on the basis of the set evaluation levels, holding the ideal values, and calculating a difference between the signal level of a received signal and an ideal value of the signal level; a loop filter for storing the difference between the signal level of the received signal and the ideal value of the signal level; and a multiplier for adjusting the gain of the received signal on the basis of the output from the loop filter, thereby to correct variations in the received signal.

According to another embodiment of the present invention, in the data reception apparatus discussed above, on receipt of an initialization pattern signal in which a maximum signal level and a minimum signal level appear alternately, the synchronization detection unit establishes clock synchronization, and the evaluation level holding unit sets the evaluation levels.

According to another embodiment of the present invention, in a data reception apparatus discussed above, on receipt of an initialization pattern signal in which a maximum signal level and a minimum signal level appear alternately, which signal is included in the front portion of the initialization pattern signal, the synchronization detection unit establishes clock synchronization; and on receipt of a signal in which all signal levels appear in a predetermined arrangement, which signal is included in the rear portion of the initialization pattern signal, the evaluation level holding unit sets the evaluation levels.

According to another embodiment of the present invention, the data reception apparatus discussed above further includes an evaluation level setting start detection unit for detecting the beginning of the signal in which all signal levels appear in a predetermined arrangement.

As described above, according to the embodiment of the present invention wherein there is provided an evaluation level setting method to be employed in a data reception apparatus which receives a signal in which one or more bits of data is assigned as one data symbol to a signal level, and the method comprises: receiving an initialization pattern signal which is outputted from a data transmission apparatus, at turn-on of power or immediately after reset; establishing clock synchronization on the basis of the initialization pattern signal, and setting evaluation levels with which signal levels are subjected to threshold evaluation; calculating ideal values of the respective signal levels on the basis of the evaluation levels which are set according to the initialization pattern signal, and holding the ideal values; and adjusting the gain of a received signal on the basis of a difference between the signal level of the received signal and an ideal value of the signal level, thereby to correct variations in the received signal, evaluation levels of data symbols can be set on the basis of the actual values of the initialization pattern signal, whereby evaluation levels can be set in accordance with the transmission path. Furthermore, even when the signal levels of the received data symbols vary due to variations in the voltage of the data transmission apparatus or variations in the reference voltage of the data reception apparatus, decoding of the data symbols can be carried out.

Further, according to the embodiment of the present invention in the evaluation level setting method discussed above, wherein the initialization pattern signal is a signal in which a maximum signal level and a minimum signal level appear alternatively, evaluation levels of data symbols can be set after synchronization is established by clock reproduction.

Further, according to the embodiment of the present invention in the evaluation level setting method discussed above, wherein the initialization pattern signal comprises a signal in which a maximum signal level and a minimum signal level appear alternately, and a following signal in which all signal levels appear in a predetermined arrangement, evaluation levels of data symbols can be set after synchronization is established by clock reproduction. Further, all of the signal levels can be obtained without scrambling the initialization pattern signal.

Further, according to the embodiment of the present invention wherein there is provided a data reception apparatus for receiving a signal in which one or more bits of data is assigned as one data symbol to a signal level, and the apparatus comprises: a synchronization detection unit for performing clock reproduction on the basis of received signal levels, thereby to detect establishment of synchronization; an evaluation level holding unit for calculating evaluation levels with which the respective signal levels are subjected to threshold evaluation, and holding the evaluation levels; a data symbol value holding unit for calculating ideal values of the respective signal levels on the basis of the set evaluation levels, holding the ideal values, and calculating a difference between the signal level of a received signal and an ideal value of the signal level; a loop filter for storing the difference between the signal level of the received signal and the ideal value of the signal level; and a multiplier for adjusting the gain of the received signal on the basis of the output from the loop filter, thereby to correct variations in the received signal, evaluation levels of data symbols can be set on the basis of the actual values of the initialization pattern signal received, whereby accurate data reception can be carried out without being influenced by the values of the received signal levels. Furthermore, even when the signal levels of the received data symbols vary due to variations in the voltage of the data transmission apparatus or variations in the reference voltage of the data reception apparatus, decoding of the data symbols can be carried out, whereby accurate data reception can be carried out without being influenced by the pattern of the transmitted data symbols or the values of the received signal levels.

Further, according to the embodiment of the present invention in the data reception apparatus discussed above, wherein on receipt of an initialization pattern signal in which a maximum signal level and a minimum signal level appear alternately, the synchronization detection unit establishes clock synchronization, and the evaluation level holding unit sets the evaluation levels, evaluation levels of data symbols can be set on the basis of the actual values of the initialization pattern signal, whereby accurate data reception can be carried out without being influenced by the values of the received signal levels. Therefore, evaluation levels of data symbols can be set on the basis of the actual values of the initialization pattern signal, whereby accurate data reception can be carried out without being influenced by the values of the received signal levels.

Further, according to the embodiment of the present invention in the data reception apparatus discussed above, wherein upon receipt of an initialization pattern signal in which a maximum signal level and a minimum signal level appear alternately, which signal is included in the front portion of the initialization pattern signal, the synchronization detection unit establishes clock synchronization; and on receipt of a signal in which all signal levels appear in a predetermined arrangement, which signal is included in the rear portion of the initialization pattern signal, the evaluation level holding unit sets the evaluation levels, evaluation levels of data symbols can be set on the basis of the actual values of the initialization pattern signal, whereby accurate data reception can be carried out without being influenced by the values of the received signal levels. Therefore, evaluation levels of data symbols can be set on the basis of the actual values of the initialization pattern signal, whereby accurate data reception can be carried out without being influenced by the values of the received signal levels.

Further, according to the embodiment of the present invention wherein a data reception apparatus discussed above, further includes an evaluation level setting start detection unit for detecting the beginning of the signal in which all signal levels appear in a predetermined arrangement, evaluation levels can be set after synchronization is established by clock reproduction.

BEST MODE TO EXECUTE THE INVENTION

Hereinafter, an embodiment of the present invention will be described with reference to the drawings. However, the embodiment described hereinafter is merely an example, and the present invention is not necessarily restricted thereto.

(Embodiment 1)

An evaluation level setting method described in any of claims 1 and 2 of the present invention, and a data reception apparatus described in any of claims 5 and 6 will be described as a first embodiment with reference to the drawings.

Figure 1:
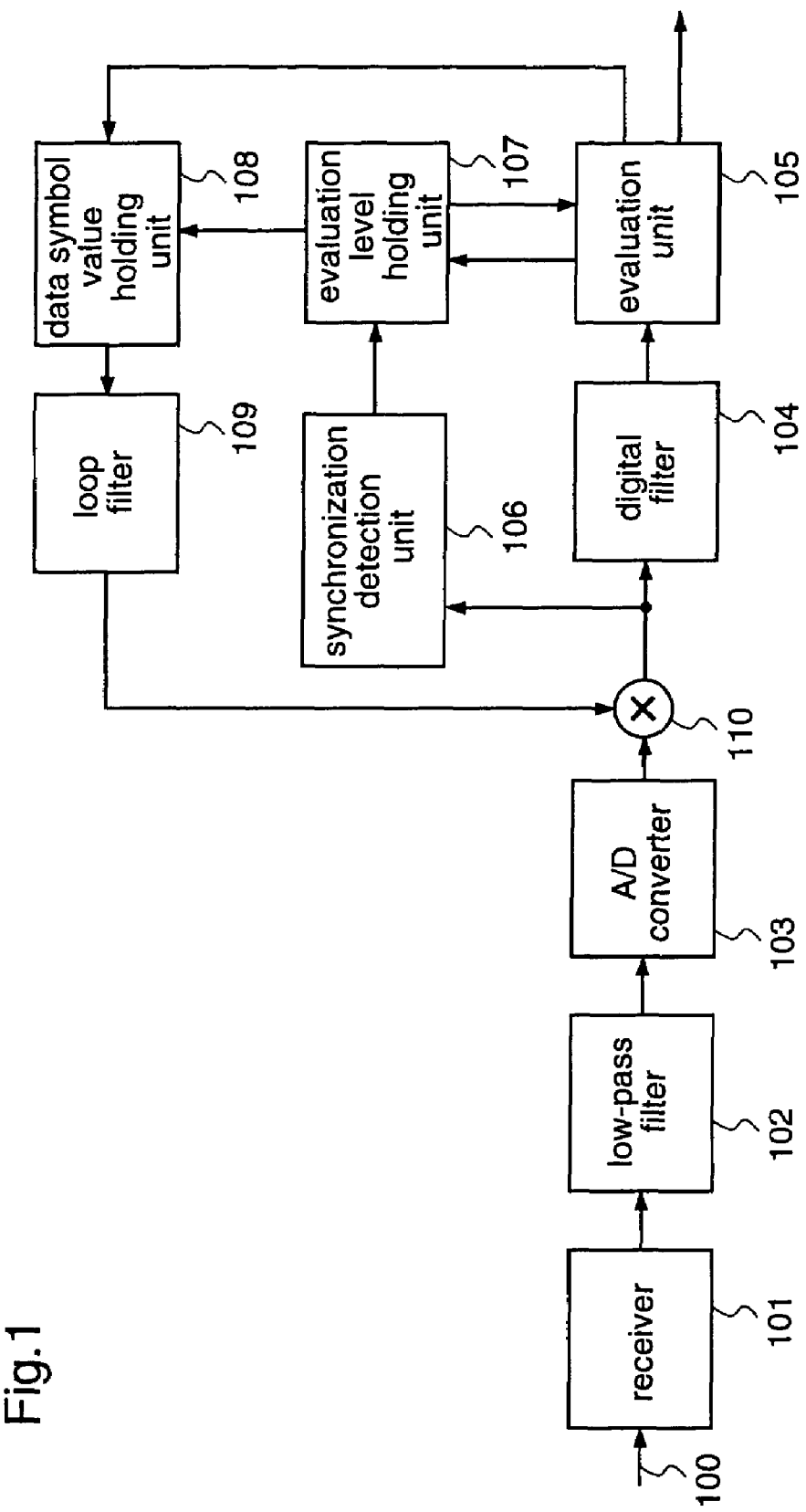
FIG. 1 is a block diagram illustrating the construction of a data reception apparatus according to a first embodiment of the present invention.
Figure 2:
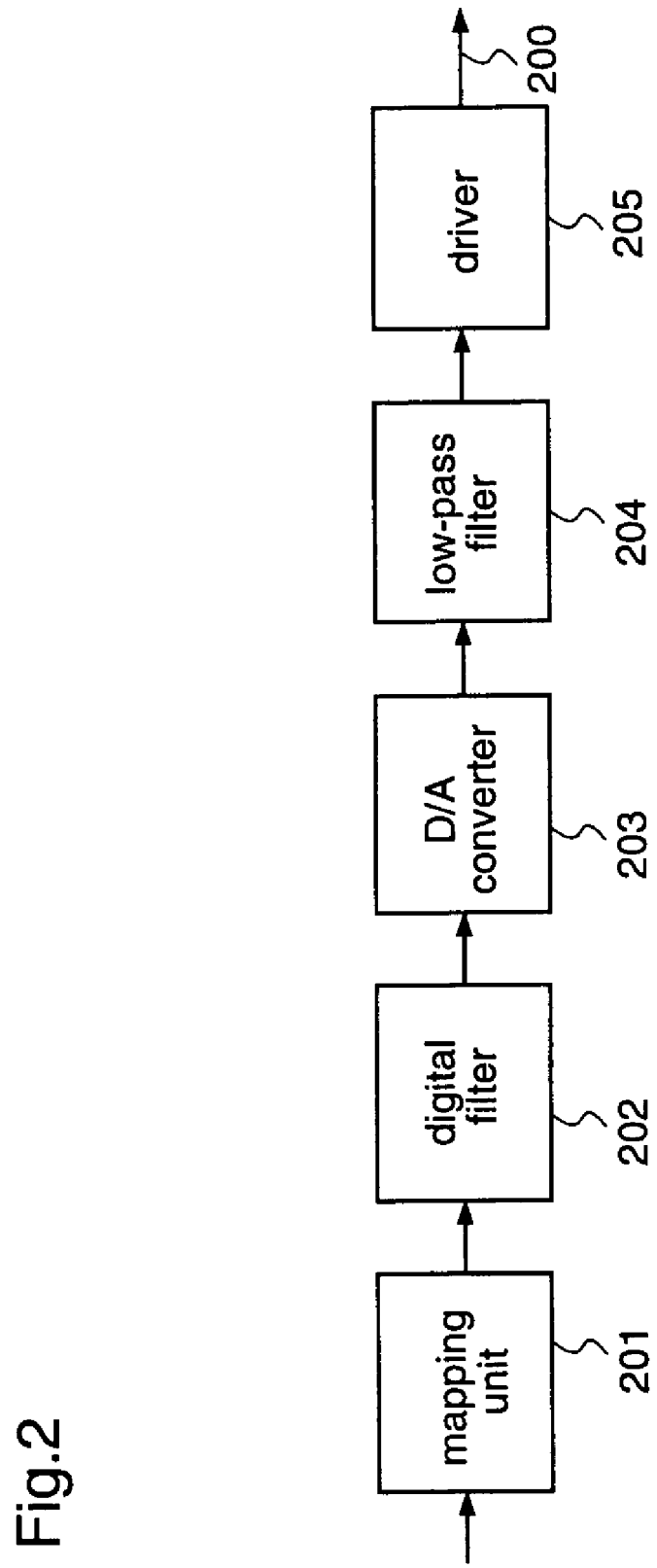
FIG. 2 is a block diagram illustrating the construction of a data transmission apparatus according to the first embodiment of the present invention.

FIG. 1 is a block diagram illustrating the construction of a data reception apparatus according to the first embodiment, and FIG. 2 is a block diagram illustrating the construction of a data transmission apparatus according to the first embodiment.

As shown in FIG. 1, the data reception apparatus according to the first embodiment is provided with a transmission path 100 in which a signal is transmitted; a receiver 101 for receiving the signal; a low-pass filter 102 for removing noises outside the signal band; an A/D converter 103 for converting the signal into digital data; a digital filter 104 which allows a band of frequency components corresponding to half of the symbol rate to pass; a synchronization detection unit 106 for detecting synchronization; an evaluation level holding unit 107 for setting evaluation levels to be used for threshold evaluation of the signal levels, and holding the evaluation levels; an evaluation unit 105 for performing threshold evaluation on the basis of the signal level evaluation values which are stored in the evaluation level holding unit 107, and decoding the data symbols; a data symbol value holding unit 108 for calculating ideal values of signal levels which are assumed to be taken when ideal reception is carried out, on the basis of the evaluation values of the signal levels, and holding the ideal values; a loop filter 109 for accumulating (integrating) differences between the actual signal levels and the ideal values; and a multiplier 110 for performing gain control for the A/D converter 103.

On the other hand, as shown in FIG. 2, the data transmission apparatus according to the first embodiment of the invention is provided with a transmission path 200 in which a signal is transmitted; a mapping unit 201 for mapping the digital signal to be transmitted to eight signal levels at every symbol timing; a digital filter 202 which allows a band of frequency components corresponding to half of the symbol rate to pass; a D/A converter 203 for converting the digital data into an analog signal; a low-pass filter 204 for removing noises outside the signal band of the transmission signal; and a driver 205 for amplifying the signal intensity, and outputting the signal onto the transmission path 200.

Further, a coaxial cable or a twisted-pair cable is used as the transmission path 200. When the transmission path 200 is a twisted-pair cable, a differential output driver should be used as the driver 205.

Figures 3, 4:
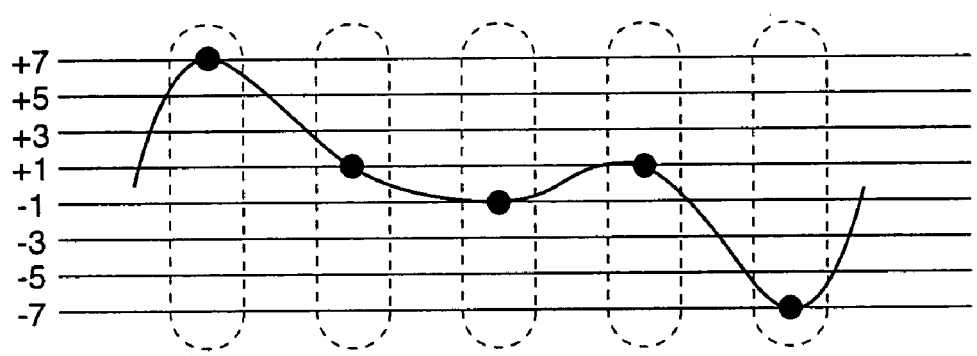
FIG. 3 is a diagram for explaining a conversion method from data symbols to signal levels, according to the first embodiment of the present invention.
FIG. 4 is a diagram illustrating an example of a waveform on a transmission path according to the first embodiment of the present invention.

As shown in FIG. 3, the mapping unit 201 maps eight kinds of 3-bit data symbols to eight signal levels. FIG. 3 is a conversion table illustrating conversion from data symbols to signal levels (mapping values), wherein 3-bit data symbols are mapped to any of eight signal levels, "−7", "−5", "−3", "−1", "+1", "+3", "+5", and "+7". Hereinafter, the data transmission apparatus performing such 8-value transmission will be described.

Next, the operation of the data transmission apparatus so constructed will be described.

Initially, ordinary data transmission will be described. In the data transmission apparatus, the mapping unit 201 maps every three bits of the digital data being transmitted, to one of eight signal levels according to the conversion table shown in figure 3, at every symbol timing. The mapped data are input to the digital filter 202. The digital filter 202 is a low-pass filter that allows a band of frequency components corresponding to half of the symbol rate to pass, and actually it is constituted so as to have appropriate roll-off characteristics in combination with the digital filter 104 of the data reception apparatus. The signal that has been passed through the digital filter 202 is converted into an analog signal by the D/A converter 203, and the analog signal is passed through the low-pass filter 204, whereby a signal within a band that is slightly larger than half of the symbol rate is obtained, and a signal having no interference between adjacent codes is obtained at readout timing. Thereby, data transmission in the finite band can be carried out. Then, the driver 205 amplifies the signal intensity of this signal, and outputs it to the transmission path 200.

An example of a waveform on the transmission path is shown in FIG. 4. In the example of FIG. 4, the signal levels are transmitted in order of "+7", "+1", "−1", "+1", "−7", . . . at every symbol timing, and data symbols "111(+7)", "100(+1)", "011(−1)", "100(+1)", "000(−7)", . . . are transmitted.

The signal so transmitted is received by the data reception apparatus.

In the data reception apparatus, the receiver 101 receives the signal, and the low-pass filter 102 removes noises outside the signal band. Next, the A/D converter 103 converts the signal into digital data, and the digital data is passed through the digital filter 104. The digital filter 104 has roll-off characteristics in combination with the digital filter 202, and it converts the digital data into a signal that can be received without being affected by interference between adjacent codes, at appropriate timing. Thereafter, the evaluation unit 105 decodes the data symbols on the basis of the signal level evaluation values which are stored in the evaluation level holding unit 107. The synchronization detection unit 106 reproduces a clock from the received data, and establishes synchronization when decoding the data symbols. Ordinary data transmission is carried out as described above. Here, "1" is set on the multiplier 110, and the output of the A/D converter 103 is input as it is to the digital filter 104.

Next, setting of evaluation levels by the data reception apparatus performing as described above will be described.

Figure 5:
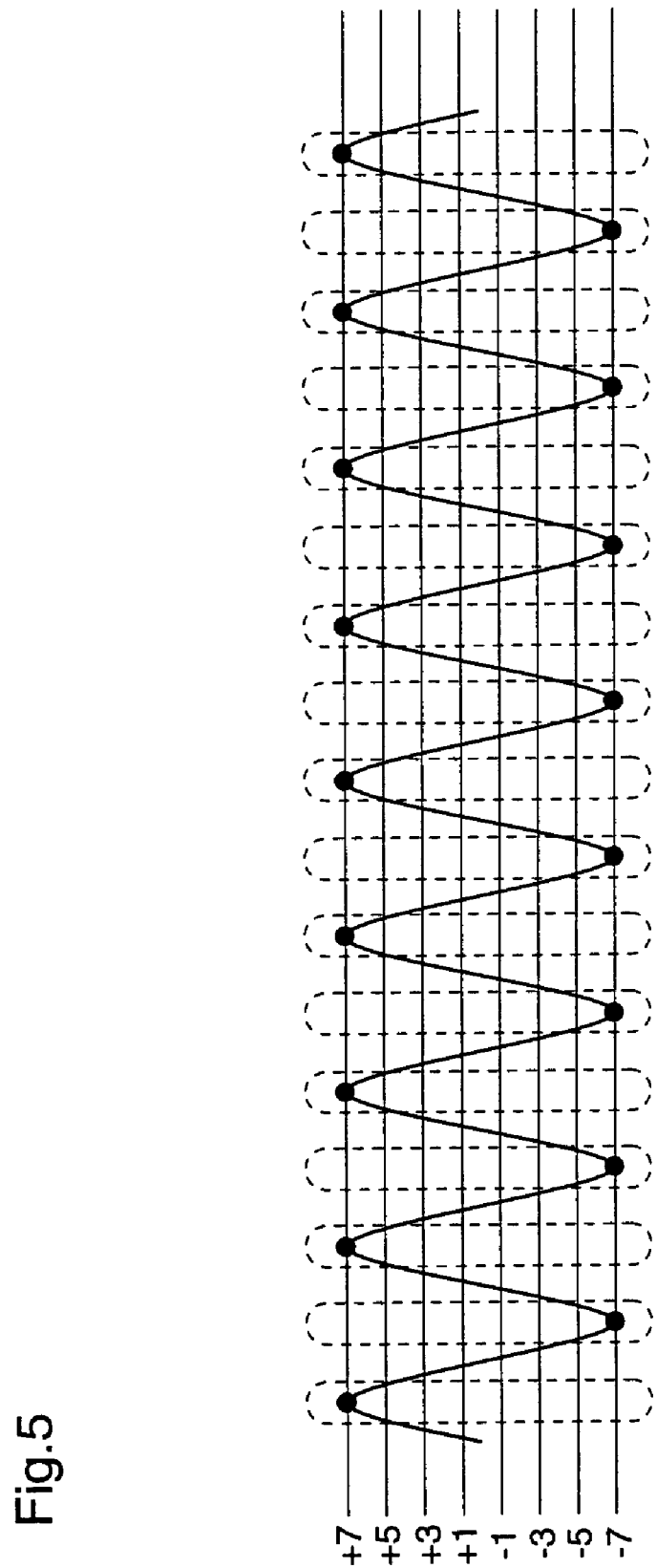
FIG. 5 is a diagram illustrating an initialization pattern signal according to the first embodiment of the present invention.
Figure 6:
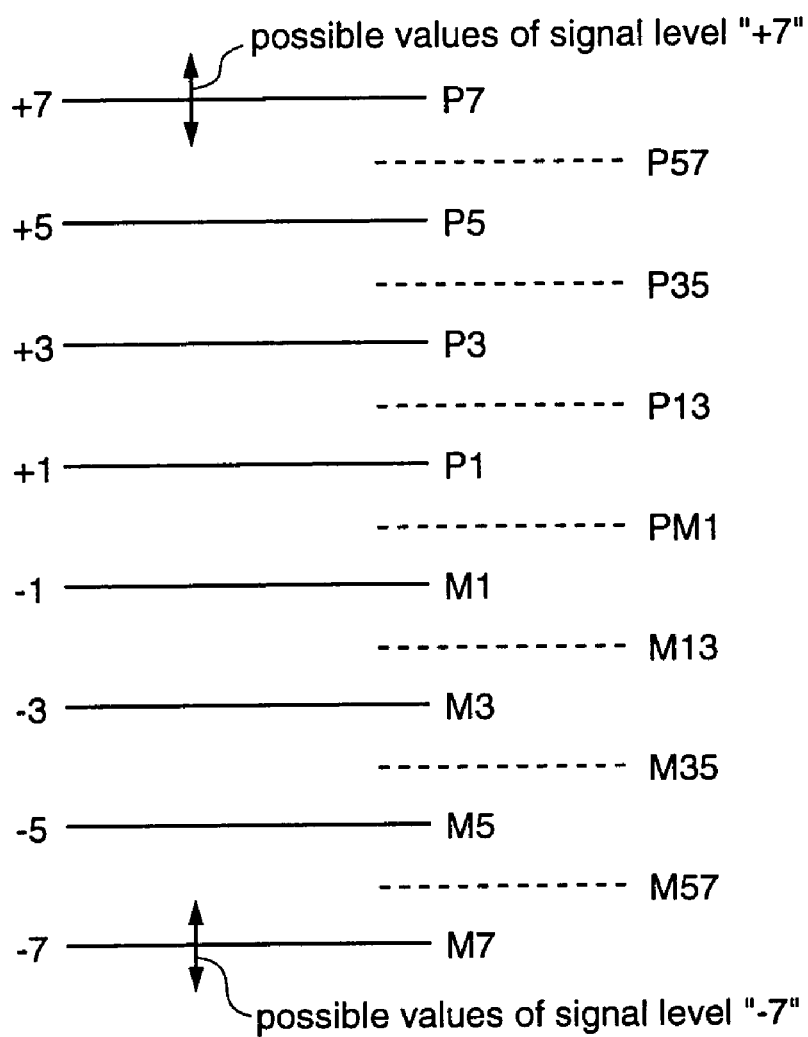
FIG. 6 is a diagram for explaining an evaluation level setting method of the data reception apparatus according to the first embodiment of the present invention.

FIG. 5 is a diagram illustrating an initialization pattern signal. FIG. 6 is a diagram illustrating setting of evaluation levels by the data reception apparatus.

As shown in FIG. 5, the initialization pattern signal is a signal in which a maximum amplitude level and a minimum amplitude level appear alternately, and it includes a frequency component equivalent to ½ of the symbol rate.

The data transmission apparatus outputs this initialization pattern signal at turn-on of power or immediately after reset.

When the data reception apparatus receives the initialization pattern signal, initially, the synchronization detection unit 106 performs clock reproduction to detect that synchronization is established. When synchronization is established, the evaluation unit 105 transmits the amplitude level of the received signal to the evaluation level holding unit 107. Since the maximum amplitude level and the minimum amplitude level appear alternately in the initialization pattern signal, the evaluation level holding unit 107 receives the signal levels "+7" and "−7" shown in FIG. 6. Then, the actual voltage values of the signal levels "+7" and "−7" which are received during a predetermined period of time are respectively averaged to obtain the averages "P7" and "M7" of the respective signal levels "+7" and "−7".

The evaluation level holding unit 107 calculates the evaluation levels (threshold values) on the basis of the obtained averages "P7" and "M7" of the respective signal levels "+7" and "−7". More specifically, the evaluation level "PM1" between the signal levels "+1" and "−1" is an intermediate value between "P7" and "M7", that is, (P7+M7)/2. Likewise, the evaluation level "P57" between the signal levels "+7" and "+5" is (P7−PM1)×6/7, the evaluation level "P35" between the signal levels "+5" and "+3" is (P7−PM1)×4/7, and the evaluation level "P13" between the signal levels "+3" and "+1" is (P7−PM1)×2/7. Further, the evaluation level "M57" between the signal levels "−7" and "−5" is (M7−PM1) ×6/7, the evaluation level "M35" between the signal levels "−5" and "−3" is (M7−PM1)×4/7, and the evaluation level "M13" between the signal levels "−3" and "−1" is (M7−PM1)×2/7. The evaluation level holding unit 107 holds these calculated values as the evaluation values.

After the evaluation levels are thus calculated and held by the evaluation level holding unit 107, ordinary data reception is started, and the evaluation unit 105 evaluates the received data with reference to the evaluation levels held by the evaluation level holding unit 107, and decodes the data symbols.

Further, the data symbol value holding unit 108 calculates ideal values of the respective signal levels with reference to the evaluation levels held by the evaluation level holding unit 107, and holds the ideal values. The ideal values of the signal levels are signal levels which are assumed to be taken when ideal reception is carried out. The ideal value P5 of the signal level "+5" is an intermediate value between "P57" and "P35", that is, (P57-P35)/2, the ideal value P3 of the signal level "+3" is (P35−P13)/2, and the ideal value P1 of the signal level "+1" is (P13−PM1)/2. Likewise, the ideal value M5 of the signal level "−5" is (M57−M35)/2, the ideal value M3 of the signal level "−3" is (M35−M13)/2, and the ideal value M1 of the signal level "−1" is (M13−PM1)/2.

The data symbol value holding unit 108 compares each signal level detected by the evaluation unit 105 with the ideal value of the signal level, and outputs a difference between them to the loop filter 109. The loop filter 109 accumulates (integrates) the differences between the actual signal levels and the ideal values thereof, and outputs the result to the multiplier 110. The multiplier 110 performs output gain control for the A/D converter 103 so that the evaluation unit 105 can perform correct evaluation according to the output of the loop filter 109.

As described above, the data reception apparatus according to the first embodiment receives the initialization pattern signal which is outputted from the data transmission apparatus at turn-on of power or reset, and the synchronization detection unit 106 detects establishment of clock synchronization on the basis of the received initialization pattern signal, and the evaluation level holding unit 107 sets the evaluation levels for evaluating the signal levels, and decodes the received data symbols on the basis of the evaluation levels. Therefore, the evaluation levels can be set in accordance with the transmission path, whereby accurate data reception can be carried out without being influenced by variations in the actual values of signal levels.

Further, since the initialization pattern signal is a signal in which a maximum amplitude level and a minimum amplitude level appear alternately, evaluation levels of data symbols can be set after synchronization is established by clock reproduction, whereby evaluation levels of data symbols can be set on the basis of the actual values of the received initialization pattern signal.

Moreover, the data symbol value holding unit 108 calculates and holds the ideal values of the respective signal levels, and the loop filter 109 controls the gain of the input signal on the basis of the differences between the accumulated actual signal levels and the ideal signal levels, whereby decoding of the data symbols can be carried out even when the actual values of the received signal levels vary due to variations in the voltage of the data transmission apparatus or variations in the reference voltage of the A/D converter. Therefore, accurate data reception can be carried out without being influenced by the pattern of the transmitted data symbols or the actual values of the received signal levels.

In the above description, the averages "P7" and "M7" of the signal levels "+7" and "−7" are obtained by averaging the actual voltage values of the signal levels "+7" and "−7" which are received during a predetermined period of time, respectively. However, the averages "P7" and "M7" may be obtained by averaging the maximum value and the minimum value of the actual voltage values of the signal levels "+7" and "−7" which are received during a predetermined period of time, respectively.

(Embodiment 2)

Next, an evaluation level setting method, and a data reception apparatus will be described as a second embodiment with reference to the drawings.

Figure 7:
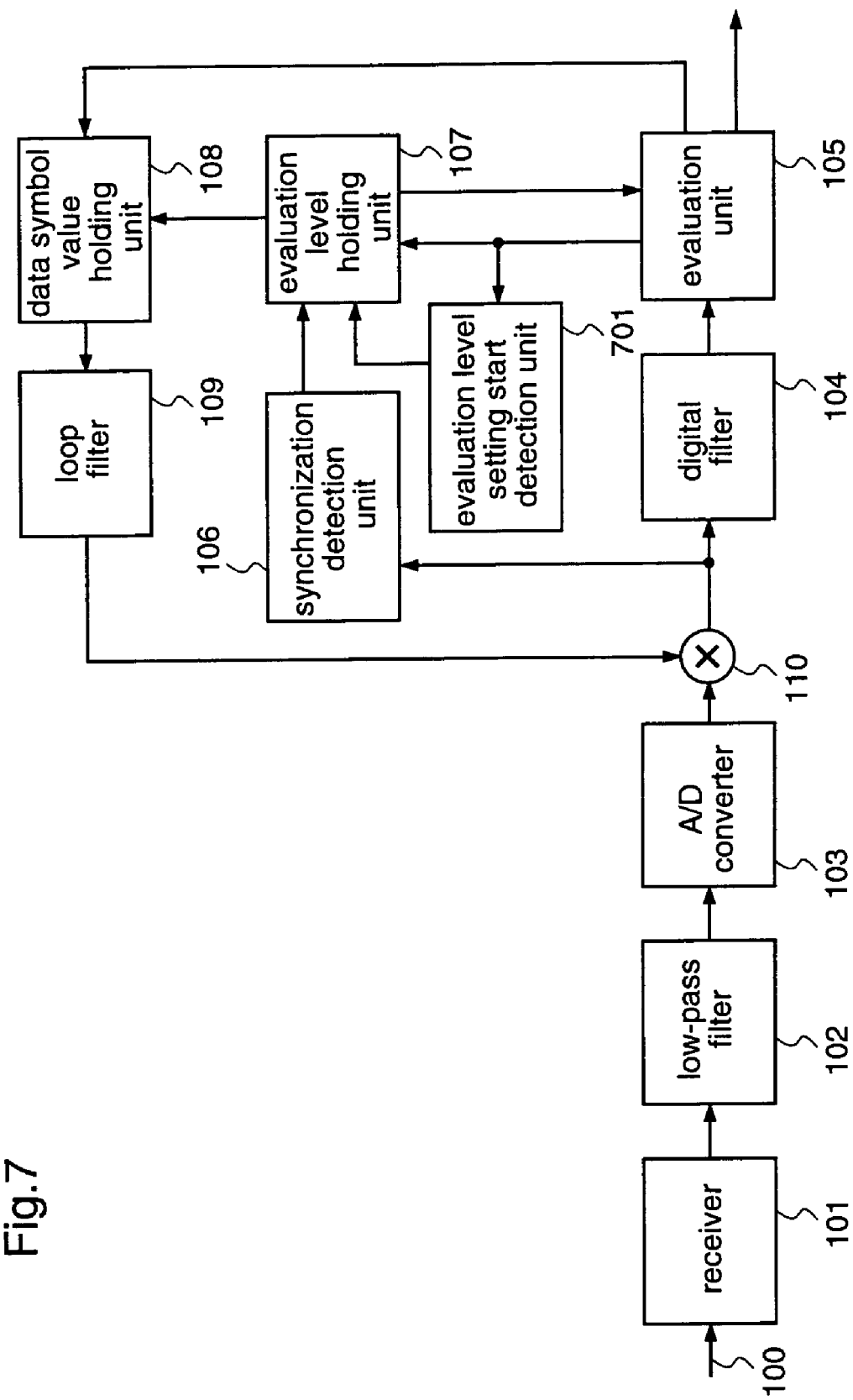
FIG. 7 is a block diagram illustrating the construction of a data reception apparatus according to a second embodiment of the present invention.

FIG. 7 is a block diagram illustrating the construction of a data reception apparatus according to the second embodiment.

As shown in FIG. 7, the data reception apparatus according to the second embodiment is provides with an evaluation level setting start detection unit 701 for detecting an evaluation level setting start pattern signal, in addition to the data reception apparatus according to the first embodiment.

Hereinafter, setting of evaluation levels by the data reception apparatus according to the second embodiment will be described.

Figure 8:
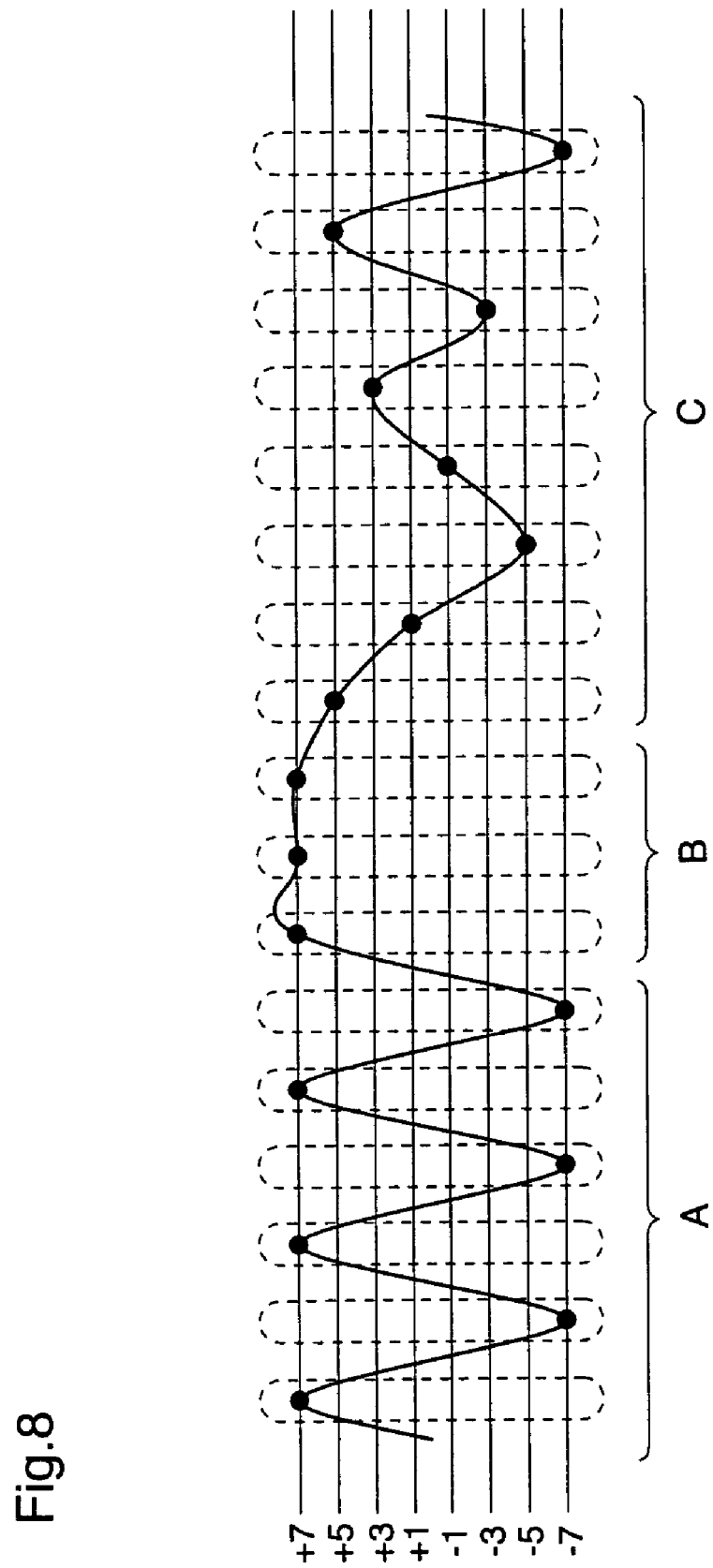
FIG. 8 is a diagram illustrating an initialization pattern signal according to the second embodiment of the present invention.
Figure 9:
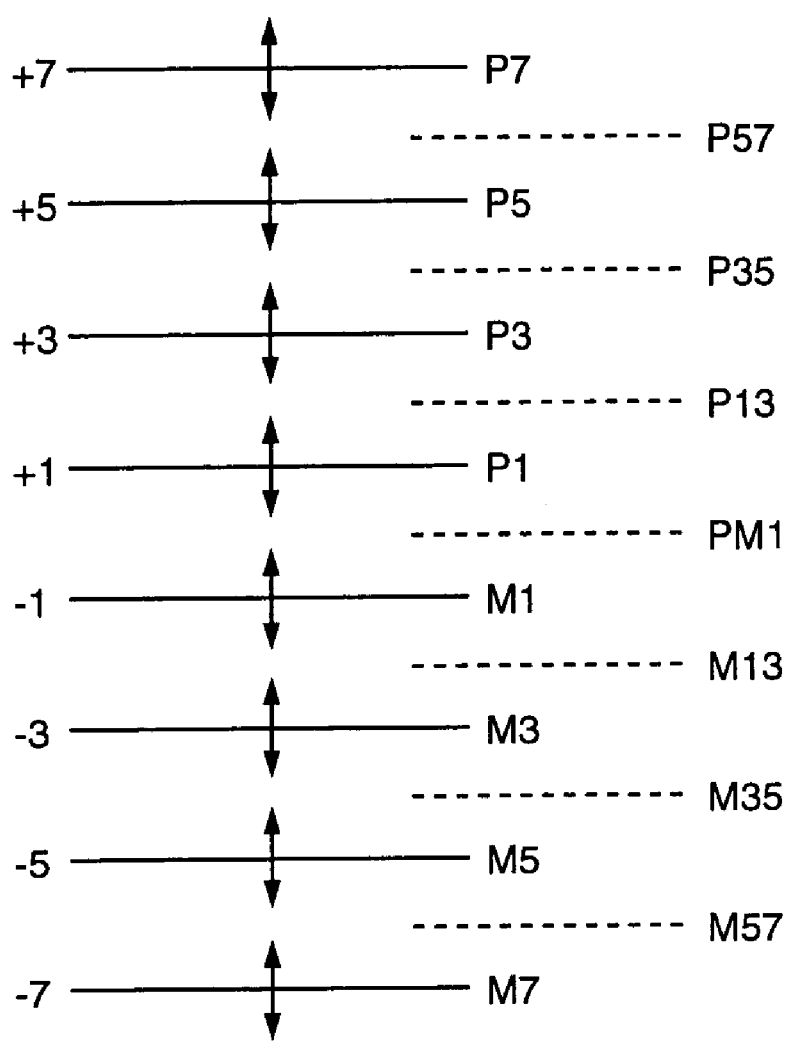
FIG. 9 is a diagram for explaining an evaluation level setting method of the data reception apparatus according to the second embodiment of the present invention.
Figure 10:
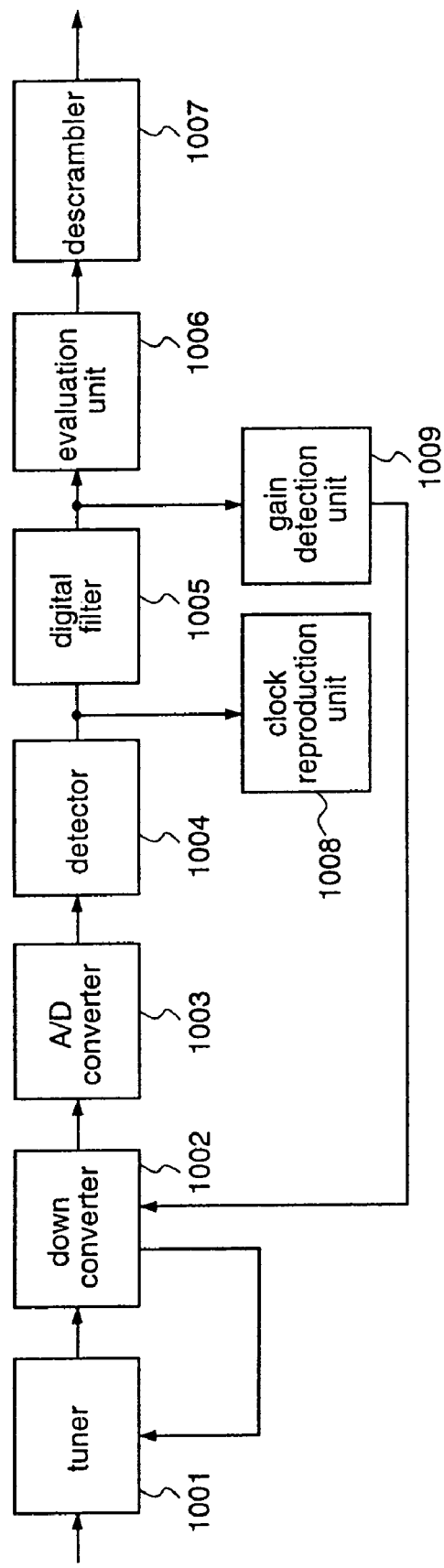
FIG. 10 is a block diagram illustrating the construction of a CATV data receiver as a conventional transmission apparatus.

FIG. 8 is a diagram illustrating an initialization pattern signal. FIG. 9 is a diagram illustrating setting of evaluation levels by the data reception apparatus.

The initialization pattern signal includes: a synchronization pattern signal in which a maximum amplitude level and a minimum amplitude level appear alternately, and a frequency component equivalent to ½ of the data symbol rate is included (portion A in FIG. 8); an evaluation level setting start pattern signal as the maximum amplitude level (portion B in FIG. 8); and an evaluation level setting pattern signal of a data pattern that is prescribed by the data transmission apparatus and the data reception apparatus (portion C in FIG. 8). The evaluation level setting start pattern signal is a signal for recognizing the end of the synchronization pattern signal, and the start of the evaluation level setting pattern signal. Further, FIG. 8 shows an example in which a predetermined arrangement of signal levels in the evaluation level setting pattern signal is "+5", "+1", "−5", "−1", "+3", "−3", "+5", "−7". Further, the evaluation level setting pattern signal is desired to be a signal such as a PN pattern, in which all of the signal levels are included, and various patterns appear.

The data transmission apparatus outputs the initialization pattern signal at turn-on or power or immediately after reset.

When the data reception apparatus receives the synchronization pattern signal, initially, the synchronization detection unit 106 performs clock reproduction to detect that synchronization is established. The evaluation level setting start detection unit 701 detects the evaluation level setting start pattern signal to be received later, and performs setting of evaluation levels on receipt of the evaluation level setting pattern signal.

The evaluation level holding unit 107 receives the evaluation level setting pattern signal, and holds the signal levels. That is, as shown in FIG. 9, the values of the respective signal levels "+7", "+5", "+3", "+1", "−7", "−5", "−3", and "−1" are obtained as "P7", "P5", "P3", "P1", "M7", "M5", "M3", and "M1", respectively.

Next, the evaluation level holding unit 107 calculates evaluation levels to be used for threshold evaluation of the signal levels, on the basis of the obtained signal level values. That is, the evaluation value "P57" between the signal levels "+7" and "+5" is calculated by averaging the minimum value of the signal level "+7" and the maximum value of the signal level "+5". Likewise, the evaluation value "P35" between the signal levels "+5" and "+3" is the average of the minimum value of the signal level "+5" and the maximum value of the signal level "+3", the evaluation value "P13" between the signal levels "+3" and "+1" is the average of the minimum value of the signal level "+3" and the maximum value of the signal level "+1", the evaluation value "M57" between the signal levels "−7" and "−5" is the average of the minimum value of the signal level "−7" and the maximum value of the signal level "−5", the evaluation value "M35" between the signal levels "−5" and "−3" is the average of the minimum value of the signal level "−5" and the maximum value of the signal level "−3", the evaluation value "M13" between the signal levels "−3" and "−1" is the average of the minimum value of the signal level "−3" and the maximum value of the signal level "−1", and the evaluation value "PM1" between the signal levels "+1" and "−1" is the average of the minimum value of the signal level "+1" and the maximum value of the signal level "−1". The evaluation level holding unit 107 holds the calculated values as evaluation levels.

While in the above description each evaluation level is obtained by averaging the maximum value and the minimum value of adjacent signal levels, an intermediate value of the average values of the respective signal levels detected may be taken, with the same effect as described above.

After the evaluation level holding unit 107 calculates and holds the evaluation levels as described above, ordinary data reception is started, and the evaluation unit 105 evaluates the received data with reference to the evaluation levels stored in the evaluation level holding unit 107, and decodes the data symbols.

Further, the data symbol value holding unit 108 calculates ideal values of the respective signal levels with reference to the evaluation levels stored in the evaluation level holding unit 107, and holds the ideal values. The ideal value P5 of the signal level "+5" is an intermediate value between "P57" and "P35", that is, (P57−P35)/2, the ideal value P3 of the signal level "+3" is (P35−P13)/2, and the ideal value P1 of the signal level "+1" is (P13−PM1)/2. Further, the ideal value M5 of the signal level "−5" is (M57−M35)/2, the ideal value M3 of the signal level "−3" is (M35−M13)/2, and the ideal value M1 of the signal level "−1" is (M13−PM1)/2.

The data symbol value holding unit 108 compares each signal level of the received signal that is detected by the evaluation unit 105 with the ideal value of the signal level, and outputs a difference between them to the loop filter 109. Then, the loop filter 109 accumulates (integrates) the difference between the actual signal level and the ideal value of the signal level, and outputs the result to the multiplier 110. The multiplier 110 performs output gain control of the A/D converter 103 so that the evaluation unit 105 can perform correct evaluation according to the output of the loop filter 109.

While in the above description the ideal value each signal level is the intermediate value of the evaluation levels, the average of the respective signal levels detected may be taken with the same effect as described above.

As described above, in the data reception apparatus according to the second embodiment, the data reception apparatus receives the initialization pattern signal which is outputted from the data transmission apparatus at turn-on of power or reset, and the synchronization detection unit 106 detects establishment of clock synchronization on the basis of the received initialization pattern signal, and the evaluation level holding unit 107 sets evaluation levels to be used for evaluation of the signal levels, and decodes the received data symbols on the basis of the evaluation levels. Therefore, evaluation levels can be set in accordance with the transmission path, and accurate data reception can be carried out without being affected by variations in the actual values of the signal levels.

Further, the initialization pattern signal is a signal in which all of the signal levels appear in an arrangement that is predetermined by the data transmission apparatus and the data reception apparatus, after a signal in which the maximum amplitude level and the minimum amplitude level appear alternately. Therefore, evaluation levels can be set on the basis of the actual values of the signal levels after synchronization is established by clock reproduction. Further, all of the signal levels can be obtained from the initialization pattern signal without scrambling the transmission data.

Moreover, the data symbol value holding unit calculates and holds the ideal values of the respective signal levels, and integrates the differences between the actual signal levels and the ideal values thereof, thereby to control the gain of the inputted signal. Therefore, even when the actual values of the received signal levels vary due to variations in the voltage of the data transmission apparatus or variations in the reference voltage of the A/D converter 103, accurate data reception can be carried out without being affected by such variations.

Furthermore, in the above description, 3 bits of data are mapped to any of eight signal levels "−7", "−5", "−3", "−1", "+1", "+3", "+5", and "+7" according to the combination of data, in the mapping unit 201 of the data transmission apparatus. However, the present invention is not restricted to 8-value transmission, and arbitrary multi-valued transmission may be carried out.

Furthermore, differential mapping in which mapping of data to be transmitted is carried out in accordance with a previously-mapped signal level may be employed, and evaluation of each signal level may be carried out on the basis of a difference between a signal level received by the data reception apparatus and a previously-received signal level, followed by decoding. Also in this case, the evaluation level holding unit holds the evaluation levels based on the differences in the signal levels, whereby the same effect as described above can be achieved.

Applicability in Industry

The present invention can provide an evaluation level setting method and a data reception apparatus, in which an initialization pattern signal is received at turn-on of power or immediately after reset, and synchronization is established, and thereafter, evaluation levels to be used for threshold evaluation of signal levels are set on the basis of the voltage values of the signal levels included in the initialization pattern signal.

The invention claimed is:

1. An evaluation level setting method to be employed in a data reception apparatus which receives a signal in which one or more bits of data is assigned as one data symbol to a signal level, said evaluation level setting method comprising:

receiving an initialization pattern signal which is outputted from a data transmission apparatus, at turn-on of power or immediately after reset;

establishing clock synchronization based on the initialization pattern signal, and setting evaluation levels with which signal levels are subjected to threshold evaluation;

calculating ideal values of the respective signal levels based on the evaluation levels which are set according to the initialization pattern signal, and holding the ideal values; and adjusting a gain of a received signal based on a difference between a signal level of the received signal and an ideal value of the signal level, thereby to correct variations in the received signal.

2. An evaluation level setting method as defined in claim 1, wherein said receiving of the initialization pattern signal comprises receiving an initialization pattern signal that is a signal in which a maximum signal level and a minimum signal level appear alternately.

3. An evaluation level setting method as defined in claim 1, wherein said receiving of the initialization pattern signal comprises receiving an initialization pattern signal that comprises a signal in which a maximum signal level and a minimum signal level appear alternately, and a following signal in which all signal levels appear in a predetermined arrangement.

4. A data reception apparatus for receiving a signal in which one or more bits of data is assigned as one data symbol to a signal level, said data reception apparatus comprising:

a synchronization detection unit operable to reproduce a clock, based on received signal levels to detect establishment of synchronization;

an evaluation level holding unit operable to calculate evaluation levels with which the respective signal levels are subjected to threshold evaluation, and to hold the evaluation levels;

a data symbol value holding unit operable to calculate ideal values of the respective signal levels based on the set evaluation levels, to hold the ideal values, and to calculate a difference between a signal level of a received signal and an ideal value of the signal level;

a loop filter operable to store the difference between the signal level of the received signal and the ideal value of the signal level; and a multiplier operable to adjust a gain of the received signal, based on the output from said loop filter, to correct variations in the received signal.

5. A data reception apparatus as defined in claim 4, wherein upon receipt of an initialization pattern signal in which a maximum signal level and a minimum signal level appear alternately, said synchronization detection unit is operable to establish clock synchronization, and said evaluation level holding unit is operable to set the evaluation levels.

6. A data reception apparatus as defined in claim 4, wherein upon receipt of an initialization pattern signal in which a maximum signal level and a minimum signal level appear alternately, which signal is included in a front portion of an initialization pattern signal, said synchronization detection unit is operable to establish clock synchronization, and upon receipt of a signal in which all signal levels appear in a predetermined arrangement, which signal is included in a rear portion of the initialization pattern signal, said evaluation level holding unit is operable to set the evaluation levels.

7. A data reception apparatus as defined in claim 6, further comprising an evaluation level setting start detection unit operable to detect a beginning of a signal in which all signal levels appear in a predetermined arrangement.

* * * * *

UNITED STATES PATENT AND TRADEMARK OFFICE
CERTIFICATE OF CORRECTION

| | | |
|---|---|---|
| PATENT NO. | : 7,042,965 B2 | |
| APPLICATION NO. | : 10/398451 | |
| DATED | : May 9, 2006 | |
| INVENTOR(S) | : Noboru Katta et al. | |

It is certified that error appears in the above-identified patent and that said Letters Patent is hereby corrected as shown below:

On the Front Page

In section (56) References Cited, under the "FOREIGN PATENT DOCUMENTS" heading, please correct the following reference:
      JP      5-14419      1/19<u>9</u>3

In section (57) Abstract, please correct the abstract to consist of one combined paragraph as follows instead of two separate paragraphs as in the patent.
ABSTRACT
An evaluation level setting method and a data reception apparatus in which the method is implemented accurately evaluate signal levels in multi-valued transmission for transmitting data while assigning one or more bits of data as one data symbol to a signal level. A data transmission apparatus outputs an initialization pattern signal at turn-on of power or after reset, and the data reception apparatus establishes clock synchronization on the basis of the received initialization pattern signal and starts data reception after setting of evaluation levels to be used for threshold evaluation of signal levels.

Signed and Sealed this

Sixteenth Day of January, 2007

JON W. DUDAS
*Director of the United States Patent and Trademark Office*